Patented Mar. 17, 1942

2,276,956

UNITED STATES PATENT OFFICE 2,276,956

LUBRICATING PRODUCT

Anthony H. Gleason, Westfield, N. J., and William J. Sparks, Peoria, Ill., assignors to Standard Oil Development Company, a corporation of Delaware No Drawing. Application June 22, 1940, Serial No. 341,958

9 Claims. (Cl. 252—54)

This invention relates to improvements of hydrocarbon oils by blending therewith addition products of high molecular weight unsaturated polymeric hydrocarbons and organic hypohalites. It is concerned particularly with improving viscosity characteristics of hydrocarbon oils with such addition products possessing satisfactory stability and blending characteristics. It is also concerned with enhancing other qualities of hydrocarbon lubricating products.

Important practical advantages are obtained by employing blending agents effective in small concentrations for thickening hydrocarbon oils and forming oil blends that undergo decreased variation in viscosity with change in temperature. A number of materials have been found to be useful for these purposes to various degrees. Among these materials are rubber-like polymeric hydrocarbons chemically modified by hydrogenation to improve their blending characteristics. But prior to the present invention none of these high molecular weight unsaturated polymeric hydrocarbons were simply converted by chemical combination with an organic hypohalite into addition products of improved blending qualities and effectiveness in improving the viscosity characteristics of hydrocarbon oils.

The unsaturated polymeric hydrocarbons, such as natural and synthetic rubber compounds, contain a number of double bonds between carbon atoms in linear chain molecules, and these compounds react very readily with an ester of a hypohalous acid. The reaction takes place at ordinary or slightly elevated temperatures with evolution of heat, and the chemical combination of the ester with the hydrocarbon compound may be made to go substantially to quantitative completion, as shown by the analysis of the final products.

For the objects of this invention, the polymeric unsaturated hydrocarbon treated should have a molecular weight substantially above 1000, ranging up to 200,000, or higher, and should have an unsaturation giving the compound an iodine number above about 20 and ranging upwardly to about 400. For most purposes, including some desired degree of thickening, the molecular weight of the rubber compound, whether it be a synthetic polymer or modified natural rubber, is preferably from 3000 to about 50,000 and the iodine number of the rubber compound is preferably from about 50 to 200.

The organic hypohalite reactant is selected to form a product which has a satisfactory stability, solubility in the hydrocarbon oil to be treated, and ability to make the desired improvement in a hydrocarbon oil blend. In general, hypochlorite esters of monohydric aliphatic alcohols (alkyl hypochlorites) may be used, but the hypochlorites of tertiary aliphatic alcohols having from 4 to 6 carbon atoms, e. g. ter-butyl hypochlorite, are preferred, especially on account of their satisfactory behavior in the reaction and stability of the product. However, other organic compounds containing oxygen and chlorine in a manner which permits the same addition reaction with the unsaturated hydrocarbons may also be used, provided these reactants form with the hydrocarbon products of suitable stability and solubility. Such reactants may even contain cyclic hydrocarbon radicals.

It has been found that the addition product of the polymeric unsaturated hydrocarbon and organic hypochlorite, in general, should have a chlorine content ranging from about 2% to 20% by weight to be satisfactory for use as a blending agent in hydrocarbon oils, and preferably the chlorine content should be from 5% to 15%.

In order to obtain the desired composition, the organic hypochlorite and the polymeric hydrocarbon compound to be treated may be first evaluated for the proportion of chlorine which would be added to the unsaturated bonds in the hydrocarbon compound. From the nature of the synthesis and analysis of the final product, the alkyl hypochlorite is considered as adding to the double bonds so as to form chloro-ethers, and the process may be conveniently termed a chloroalkoxylation.

In brief, the addition reaction is carried out simply by dissolving a polymeric unsaturated hydrocarbon in an inert solvent, e. g. benzene, xylene, or a low molecular weight alkyl halide, e. g. carbon tetrachloride or ethylene dichloride, and admixing the organic hypohalite. The concentration of the polymeric hydrocarbon in the solution should preferably be low and not exceed about 10%. The reaction proceeds with ease upon addition of the organic hypohalite reactant. The esters of the hypohalous acid may be formed in the reaction mixture by using known procedures of treating an alcohol in alkaline solution with chlorine. The addition product obtained by combination of the organic hypohalite with the hydrocarbon may be recovered from the reaction mixture by precipitation or be concentrated by distillation, and thereafter may be washed with the precipitating agent and then dried.

The unsaturated polymeric hydrocarbon reactant preferably should not have a substantially greater amount of unsaturation than is present in natural rubber. A natural rubber may be modified by hydrogenation to some extent, in order to decrease the amount of unsaturation. Furthermore, the hydrocarbon polymeric compound may be modified, as for example by milling, softening, or depolymerization to some extent in order to lower the molecular weight and increase the solubility of the compound. However, the rubber should not be oxidized or vulcanized to any great extent. In case the compound is to be converted into a blending agent of high thickening effectiveness, the polymer should preferably have a relatively high molecular weight. In substituting a synthetic rubber polymer for natural rubber, diene polymers, e. g. butadiene polymers, may be used as such or modified as indicated for natural rubber. To eliminate the need of reducing the iodine number by hydrogenation, a diene copolymer with an iso-mono-olefin, e. g. isobutene may be employed.

The following examples will further illustrate the nature of this invention.

*Example*

A 2% to 5% solution of pale crepe rubber in benzol was reacted with tertiary butyl hypochlorite added in excess of the theoretical amount for complete reaction. The reaction was complete when heat was no longer evolved. After standing for a while, the product was recovered by precipitation with alcohol from the solution.

Upon analysis the product showed a chlorine content of 18.77%, an amount equivalent to about 96% of that required theoretically for complete saturation of the double bonds in the rubber by addition thereto of chloro and alkoxy groups.

The addition product thus obtained was tested in an S. A. E. 20W hydrocarbon lubricating oil to determine the effect of this agent on the viscosity index of the oil. The viscosity index was determined by the comparative viscosity-temperature relation of the oil and oil blends with the addition agent as described by Dean and Davis in Chemical and Metallurgical Engineering for 36, 618 (1929). Using the hydrocarbon lubricating oil as a reference, the following data was obtained:

|  | S. A. E. 20W Ref. oil | Less than 1% blend | 2% blend |
|---|---|---|---|
| Viscosity at 100° F., Saybolt sec | 275.8 | 398.8 | 1384.0 |
| Viscosity at 210° F., Saybolt secs | 45.9 | 54.8 | 120.4 |
| Viscosity index | 13 | 76 | 110 |

From the results illustrated in the foregoing table, it can be seen that the addition products considerably improve the oils in viscosity characteristics and are capable of imparting to an oil of even low quality a high viscosity index which surpasses viscosity indices of high quality natural petroleum oils, as for example Pennsylvania lubricating oils, which, in general, have viscosity indices of about 100. This improvement is of great value in providing lubricants for ordinary motors or machinery subjected to variations of temperature; it is also of value in oil compositions having sufficiently high boiling temperatures to adapt them for lubricating functions, as for example in thickening motor fuels especially, including those used in combination-ignition engines of the Diesel type, for the alkoxy and halogen functions as present in these compounds are beneficial to the ignition qualities of such fuels.

Furthermore, the composition of the blending agent is such as to give the agent additional functional utility for improving the oiliness of the lubricant, making the lubricant have a greater degree of adhesive film strength on metal surfaces even under high loads.

The described addition products may be used as blending agents in various petroleum products having viscosities above 30 Saybolt seconds at 100° F., including Diesel fuels, industrial oils, lubricating oils, waxes, asphaltic residues, and the like. They are suitable as compounding agents in greases or synthetic lubricants. Also, due to their oiliness promoting function, they are particularly adapted for compounding in extreme pressure lubricants. In these various compositions, they are to be used in proportions varying from about 0.1% to 5% by weight and they may be used together with other addition agents, such as pour point depressants, dyes, polymerization inhibitors, oxidation inhibitors, corrosion inhibitors, or various other oiliness agents, thickeners, etc. The halo-alkoxylated polymers may be subjected to various modifications, chemically or physically, or may be selectively fractionated prior to use in order to obtain any desired grade of products for use in preparing a desired composition.

The present invention is not to be limited by any theory regarding the formation of the polymer, nor of the addition product the polymer forms by reaction with the hypochlorite. The specific illustrations of how the material is procured and used is to be taken merely as illustrative, for various modifications are believed to come within the scope of the invention as defined in the appended claims.

We claim:

1. A lubricating composition comprising a lubricating hydrocarbon oil blended with a minor proportion of a chemically combined addition product of a high molecular weight unsaturated polymeric hydrocarbon and an alkyl hypochlorite.

2. A lubricating composition comprising a lubricating oil blended with a minor proportion of a chloro-alkoxylated rubber containing from about 2% to 20% of chlorine.

3. A composition of matter comprising a hydrocarbon oil having a viscosity above about 30 Saybolt seconds at 100° F. and containing from 0.1% to 5% of chloro-alkoxylated polymers of a di-olefin, said polymers having an average molecular weight above 1000 and an iodine number of from about 50 to 400.

4. A lubricant comprising a petroleum lubricating oil blended with from 0.1% to 5% of a chemically combined addition product of a rubber and a tertiary alkyl hypochlorite, said addition agent product containing from about 5% to 15% of chemically combined chlorine.

5. A composition as described in claim 4, in which the rubber is a natural rubber.

6. A composition as described in claim 4, in which said rubber is a diene polymer.

7. A composition as described in claim 4, in which said rubber is a diene copolymer.

8. A lubricant composition as described in claim 4, in which said alkyl hypochlorite is tertiary butyl hypochlorite.

9. A composition of matter comprising a lubricating hydrocarbon oil blended with from 0.1% to 5% of a chloro-alkyl ether of an unsaturated polymeric hydrocarbon having a molecular weight in the range of 3,000 to 50,000 and an iodine number of from 50 to 200.

ANTHONY H. GLEASON.
WILLIAM J. SPARKS.